United States Patent [19]
Christopher et al.

[11] 3,753,778
[45] Aug. 21, 1973

[54] METHOD OF FORMING NEGATIVE ELECTRODES

[75] Inventors: Harold A. Christopher, Scotia, N.Y.; Dorus E. Faires, Gainesville, Fla.; Ethel L. Fonatella, Burnt Hills; Randall N. King, Johnstown, both of N.Y.

[73] Assignee: General Electric Company, Schenectady, N.Y.

[22] Filed: July 25, 1972

[21] Appl. No.: 274,851

[52] U.S. Cl. .................................. 136/24, 136/76
[51] Int. Cl. .......................................... H01m 35/30
[58] Field of Search ...136/75–78, 34, 33, 24, 28–31; 204/50, 130

[56] References Cited
UNITED STATES PATENTS

| | | | |
|---|---|---|---|
| 2,887,522 | 5/1959 | MacKenzie | 136/33 |
| 3,184,338 | 5/1965 | Mueller | 136/75 |
| 3,288,643 | 11/1966 | Stark | 136/24 |
| 3,424,618 | 1/1969 | Weilnbock | 136/76 X |

*Primary Examiner*—Anthony Skapars
*Attorney*—John F. Ahern et al.

[57] ABSTRACT

A method of forming a dry, fully-charged negative electrode includes electrochemically charging completely initially electrodeposited cadmium hydroxide thereby forming spongy metallic cadmium which is formed further into an electrode.

4 Claims, No Drawings

METHOD OF FORMING NEGATIVE ELECTRODES

This invention relates to the formation of negative electrodes for use in alkaline cells, and more particularly, it relates to the formation of negative electrodes which employ cadmium as the active material.

In U.S. Pat. No. 3,184,338 issued May 18, 1965, there is discussed one prior art process in which negative electrodes designed for use in nickel-cadmium cells are generally prepared by impregnating a sintered nickel plaque with a suitable cadmium salt solution, such as a molten or saturated solution of cadmium nitrate, which is subsequently converted to cadmium hydroxide by electro-chemical polarization or precipitation in an alkaline electrolyte.

Further, an earlier filed application is discussed in this patent which describes a process comprising immersing a suitable conductive metal matrix in an aqueous solution of cadmium nitrate in which one or more counter electrodes made of cadmium metal are also immersed. Electro-deposition is carried out using the cadmium electrode as the anode (+) and the conductive metal matrix as the cathode (−). Nitric acid is added to the solution to maintain a pH level between about 1.0 and 1.5. The deposit which forms in the interstices of the conductive metal matrix is a complex of cadmium hydroxide and nitrogenous compounds. Thus, it is not required to make additions of expensive cadmium nitrate salt to the solution, since the cadmium metal anode or anodes is the source of the cadmium compounds which deposit in the interstices of the cathode, rather than the cadmium nitrate salt.

This patent is directed to a process for the formation of a finished electrode from a negative electrode stock comprising a conductive metal matrix the interstices of which are filled with an electrodeposited complex of cadmium hydroxide and nitrogenous compounds, which process will improve the quality of the electrode. The process comprises the steps of partially electro-chemically charging the cadmium hydroxide in the complex which has been deposited in the interstices of a suitable conductive metal matrix to spongy metallic cadmium, applying pressure to reduce the wet partially formed electrode to a desired thickness, and discharging the partially reduced cadmium in the interstices of the matrix to cadmium hydroxide. The thus prepared electrode is subsequently washed to remove the nitrogenous compounds and dried.

In the preferred method in this patent, the partial charging of the cadmium hydroxide in the complex in the interstices of the conductive matrix to spongy cadmium is carried out in a 30 percent aqueous potassium hydroxide solution using the conductive matrix as a cathode and a nickel or other inert electrode as an anode. The preferred current density is from 0.03 amp/sq. in. to 6 amps/sq. in. of matrix area. The size reduction is preferably accomplished by pressure rolling by passing the still wet conductive matrix through smooth nickel or stainless steel rollers in order to compress the matrix to the desired thickness. The pressures required for compressing are functionally related to the thickness desired. The discharge of the rolled, partially reduced spongy metallic cadmium containing matrix to cadmium hydroxide is also preferably carried out in a 30 percent potassium hydroxide aqueous electrolytic bath with the conductive matrix as the anode with the same or a slightly lower current density per matrix area than is used to charge the cadmium hydroxide in the complex to cadmium metal. The washing is suitably done in hot tap water for 4 or 5 minutes to remove the nitrogenous compounds which are chemically detached from the complex in the conductive matrix by the charging and discharging process.

The present invention is directed to a method of forming improved dry, fully-charged negative electrodes of cadmium for primary cells and batteries.

We found also as described in the above Mueller patent that the employment of one or more cadmium electrodes, a conductive metal matrix, an aqueous solution of cadmium nitrate, and a similar charging current of 0.5 amps/in$^2$ for 22 minutes provides an electrodeposition step which results in filling the interstices of the metal matrix with an electrodeposited complex of cadmium hydroxide and nitrogenous compounds. The cadmium hydroxide is then electrochemically charged at a similar current of 0.5 amps/in$^2$ to produce spongy cadmium metal for 30 minutes.

Initially, we attempted to form dry, fully-charged electrodes from the above-formed cadmium metal. We followed this production of the spongy cadmium metal by water washing and attempted air drying as described for the subsequently produced cadmium hydroxide electrodes. This resulted in pyrolytic oxidation and destruction of the proposed electrodes. We found that through a series of unique steps, which are described subsequently, we could prevent such pyrolytic oxidation. We prepared then the above spongy cadmium metal into electrodes by a series of washing and drying steps. A number of these electrodes were discharged at room temperature in 31 percent potassium hydroxide electrolyte at rates from 10 to 50 milliamperes. These electrodes delivered unexpectedly low capacities in view of the initial deposit weight and quantity of charge passed to form the spongy metallic cadmium.

We prepared more spongy cadmium metal as above described. However, we did not wash or dry the metal. We wished to determine why the above metal could not be employed directly in a process to provide a dry, fully-charged electrode. Further electrode testing disclosed that the cadmium anodes were only partially reduced to spongy metallic cadmium when charged as in the patent process and that substantial additional charging was necessary for complete formation of spongy metallic cadmium.

We analyzed the above patent process as to why the spongy cadmium metal was only partially reduced. Secondly, we analyzed also as to whether complete reduction of the metal would be an advantage or disadvantage in the patent process. The patent describes changing cadmium hydroxide and nitrogenous compounds to spongy cadmium metal, rolling to reduce the thickness of the metal, discharging the rolled metal to an end product of cadmium hydroxide, discharged electrode, without nitrogenous compounds. Such compounds are merely washed out with tap water in several minutes.

Since cadmium hydroxide is brittle it cannot be reduced in thickness by rolling to produce the desired electrode thickness. Thus, the above patent describes partially reducing the cadmium hydroxide to spongy cadmium metal which reduction we found was only a partial reduction of the total cadmium content of the electrode. In this manner, the partially charged cadmium electrode is rolled to the desired electrode thickness after which it is electrochemically discharged to cadmium hydroxide for a secondary cell electrode. After cadmium hydroxide is produced again, the sited electrode can be washed and air-dried since its inert condition does not lead to pyrolytic oxidation and destruction. Thus, only partial reduction of the cadmium hydroxide to spongy cadmium metal is required to provide a non-brittle compressable material required to satisfy the patent process conditions. Thus, only a partial charge of the spongy cadmium metal is required since this is sufficient to provide material which can be reduced to the required electrode thickness. The actual condition of the initial charge to spongy metal is not of concern since this material is an intermediate material which is not used subsequently in the electrode structure.

The complete reduction of the spongy cadmium metal would be of a disadvantage in the patent process for several reasons. Presently, partially charged spongy material is sufficient for compression and can be rolled while wet without resulting pyrolytic oxidation. If the spongy metal was reduced completely prior to its conversion again to cadmium hydroxide such additional reduction would be totally unnecessary and more expensive to provide an intermediate material which is not required in the end product. Secondly, when the material is completely reduced it would require extreme care in handling while wet so that the material did not dry in any substantial fashion from the surrounding atmosphere while being rolled. If such drying occurs to any great extent the fully reduced spongy metal burns pyrolytyically to cadmium oxide and thus destroys the electrode. For example, such spongy material which is completely reduced and wet can be exposed to air but a few minutes whereupon there is either pyrolytic oxidation and destruction of the material or a significant loss in available electrochemical capacity due to direct oxidation in air. Thus, while the patent process was not concerned with and did not attempt to make or maintain completely reduced spongy cadmium metal there would be severe disadvantages in preparing the spongy material in completely reduced forms for the reasons mentioned above.

After the above electrodeposition step resulting in filling the interstices of the metal matrix with an electrodeposited complex of cadmium hydroxide and nitrogenous compounds, we found that through a series of unique steps we could convert the above partially reduced, spongy cadmium metal into a dry, fully-charged thin and flexible cadmium electrode.

We found unexpectedly that we could produce a negative cadmium electrode for a primary cell or battery by reducing completely the electrode deposit complex of cadmium hydroxide and nitrogenous compounds to spongy cadmium metal. We found for such a complete reduction to spongy cadmium metal, it was possible to employ a constant formation current similar to that used in the electrodeposition step but that such formation current must be maintained until the recorded potential difference between the electrode being formed and a suitable reference electrode such as a mercuric oxide electrode, in the alkaline electrolyte of the formation or charging cell shows a step-rise in voltage value and a subsequent voltage plateau indicating complete reduction of the cadmium hydroxide. At this point, hydrogen gassing occurs on the surface of the cadmium sponge. We found that reduction for less than this time period gave incomplete conversion of the active material. Further, we found that excess reduction time beyond this point caused blistering of the spongy cadmium metal at high charge rates. Thus, we found that by employing a similar current for both the electrodeposition step and the reduction step we could convert completely to cadmium metal provided the latter step was carried out as above described. In this manner we could provide a completely converted spongy cadmium metal deposit on a conductive substrate which through additional steps would provide a high specific capacity, dry-charged negative cadmium electrode for a primary cell or battery.

Further, we found for such a complete reduction to spongy cadmium, it was possible to employ a constant charging current resulting in a constant voltage with time similar to that used in the electrodeposition step but that such charging current be maintained for at least 1.5 times the ampere-hour capacity expended in the electrodeposition step. Additionally, such constant charging current as described above can be employed for a period of time until vigorous hydrogen evolution occurs on the surface of this electrode.

The highly porous electrode structure of spongy cadmium metal is transferred immediately from the alkaline reduction bath and washed with distilled, deoxygenated water. Several rinses in separate tanks containing such water is desirable to remove the remaining potassium hydroxide in the pores of the structure. After the final water rinse the electrode structure is placed in a tank of anhydrous methanol to displace as much water as possible from the pores of the electrode structure. The electrode structure is then transferred to another tank containing additional methanol. After applying a bell jar over the tank a vacuum is applied whereby the methanol is allowed to boil to purge the system of oxygen. We then found that dry nitrogen gas should be admitted to the system before the methanol is drained out. The evacuation tank is then again pumped down during which time the electrode structure is dried. We then found that to prevent pyrolytic oxidation of the electrode structure upon initial exposure to air the vacuum system must be filled with dry nitrogen gas before removal of the bell jar and exposure to ambient air. After removing the electrode structure from the tank the edges were sheared and the remainder of the electrode structure was compressed preferably at 3000 psi between large flat steel plates. We selected this particular pressure because higher compressions were found to adversely effect utilization of the active material while lower pressures do not give optimum specific capacity due to the high porosity of the unpressed deposit. The resulting structure was a dry-charged metallic cadmium electrode.

These electrodes were discharged at room temperature in 31 percent potassium hydroxide electrolyte at rates from 10 to 50 milliamperes per square inch. The results delivered consistently specific capacities in excess of 16 ampere hours per cubic inch. Similar evaluations were conducted at temperatures as low as −45° C at rates of 7.5 to 15 milliamperes per square inch which were found to yield 11 ampere hours per cubic inch.

Examples of flexible dry, fully-charged cadmium anodes made in accordance with our invention are as follows:

EXAMPLE I 3075 flexible dry, fully-charged cadmium anode electrodes were prepared in accordance with our above invention. Cadmium hydroxide was cathodically deposited on large nickel mesh substrates and electrochemically reduced to spongy cadmium metal. The plates were then washed, vacuum dried, and compressed to optimum thickness before being sheared into electrodes 0.235 inch wide and 11.5 inches long.

SUBSTRATE PREPARATION

For the cadmium electrode substrates, expanded nickel mesh flatened to 0.005 inch thickness was obtained in a 350-foot roll, eight inches wide. The mesh was cut into 18-inch lengths and annealed in hydrogen at 1,000° C for 15 minutes. Before deposition, each sheet was bolted between two 20-by-8-inch Lucite plastic frames 1/4 inch thick which held the screen taut and masked an active area 6 inches high by 16 inches long. A nickel strip 1/16 inch thick and 1/4 inch wide, inserted along the top edge of the Lucite plastic frame, was clamped by the frame and held in electrical contact with the screen. This served as a current collector lead to the substrate.

DEPOSITION PROCESS

The deposition bath consisted of about 20 gallons of 50 percent cadmium nitrate solution acidified with nitric acid to a pH of 1.5. The bath was circulated by means of a centrifugal pump through a 16-gallon reservoir, a water-cooled heat exchanger, a small Lucite plastic box containing pH electrodes for continuous monitoring of the circulating solution, and the deposition tank itself. The deposition tank was a Lucite plastic box 4 inches wide, 8 inches high, and 20 inches long, which was fitted with three magnetic stirrers to keep the solution well agitated during the deposition.

An array of 40 cadmium rods 1/2 inch in diameter by 9 inches long, with their top ends connected on one inch centers to a nickel bus bar, constituted the counter-electrode assembly, which was in the form of two 18-inch long rod rows along the walls of the deposition tank. The framed screened substrate was inserted in the tank between the two rows of cadmium rods and was connected to the negative pole of a constant-current power supply. The counter-electrode assembly was connected to the positive pole of the power supply.

Direct current for the deposition was obtained from an Exide EMH-100 Fast Battery Charger, which was modified by the introduction of an alternating current Variac on the transformer input and by elimination of the voltage control circuit. The modified charger was found to operate satisfactorily as a constant-current power supply, once the desired current was set by adjustment of the Variac.

A uniform deposition of the required quantity of anode-active material was obtained by passing a current of 94 amperes for 20 minutes which gave the desired results with maximum circulation of the solution during this period. Concentrated nitric acid was added to the bath after processing each plate, until a pH of 2.00 was reestablished. This required about one cubic centimeter of 70 percent, $HNO_3$ for each ampere hour of deposition.

The cadmium rods were consumed in the course of the deposition process. Expended rods were dissolved in concentrated nitric acid. The resulting solution was used as make-up for the deposition bath.

FORMATION PROCESS

Immediately after deposition, the plates were removed from the bath, drained of excess solution, and rinsed for about one minute in a tank of distilled water. The drained plates were then transferred to a Lucite plastic tank 3 inches wide by 8 inches high by 20 inches long, which was filled with a 31 percent KOH electrolyte. Two counter electrodes of 8-by-18-inch sheet nickel, connected in parallel to the positive pole of a second modified battery charger, a direct current power supply, constituted the counter-electrode assembly. Reduction of the deposited material was carried out at a constant current of 94 amperes. The potential difference between the charging cadmium plate and a small mercuric oxide reference electrode was recorded for each plate. To assure full charge, reduction was continued for about ten minutes after a step rise in the recorded potential was observed. The total reduction period required about 45 minutes. The KOH electrolyte of this bath was discarded after processing about 30 plates.

WASHING PROCESS

The reduced plates were washed thoroughly to remove absorbed KOH. This was done by soaking the plate for ten minutes in each of five separate wash tanks, similar to the deposition and formation tanks described above. These wash tanks were cascaded in series to permit a continuous flow of fresh distilled water at the approximate rate of four gallons per hour. The water had been previously deoxygenated by bubbling pure nitrogen gas through a two foot long porous alumina tube in a 30 gallon reservoir. The progression of electrodes through the wash tanks ran counter current to the direction of water flow.

Direct exposure of the wet reduced plate to air during transfer between tanks was minimized to prevent oxidation of the cadmium. To reduce the water content of the plate and to hasten the vacuum-drying process, the plates were soaked for a minimum of one hour in anhydrous methanol.

DRYING PROCESS

Four plates at one time were transferred to a 6-by-8 inch holding tank, 22 inches high, which was filled with anhydrous methanol. This tank was fitted with a valved drain line that passes through the center of a polished aluminum plate 15 inches in diameter by one inch thick. The aluminum plate served as the base for a glass vacuum bell jar 12 inches in diameter by 30 inches high, which was placed over the holding tank. The closed system was evacuated slowly by means of a mechanical vacuum pump and a liquid nitrogen cold trap; the alcohol covering the plates was allowed to boil for about 3 minutes to purge the system of oxygen. When the system was then back-filled with pure dry nitrogen gas to a slightly positive pressure, two to three inches of water, the alcohol was drained from the system into a separate reservoir.

The vacuum was applied as before with cold trap and was continued until the system pressure dropped to about 75 microns or less. This required about four to five hours when the alcohol collected in the cold trap was dumped frequently, every 20 to 30 minutes, during the first 1-1/2 hours, during which time about 200 cubic centimeters of liquid was collected. After the plates were dry, as indicated by a system pressure of 75 microns or less, the vacuum was relieved with a 50-50 mixture of dry nitrogen and air. This gas mixture was allowed to equilibrate with the dried plates for a minimum of 1/2 hour before the bell jar was removed.

COMPRESSION PROCESS

When the plates were removed from the Lucite plastic frames, the 6-by-16-inch masked deposit was trimmed to 5.0 by 13.0 inches. The highly porous plate was compressed between one inch thick polished steel platens, by means of a hydraulic press, with a force of 95 tons, 3000 psi pressure. After compression, the resulting structure was a smooth metallic electrode plate which was 14.5 to 15.0 mils thick and had a specific weight of about 0.81 to 0.85 gram per square inch, including the nickel substrate screen.

LEAD WELDING PROCESS

A 5 by 2 inch strip of 1-mil nickel foil was end-welded to the 5 inch wide edge of the cadmium plate by first aligning the edges of both pieces, which were placed between 1/4th-inch-thick copper blocks against a stop. This sandwich was then clamped and the exposed edge was arc welded over the entire length. When cool, the copper blocks were removed, the foil was folded away from the plate, and the welded joint was pressed to flatten the foil and small beads of nickel produced during welding.

Electrode strips were cut from the finished plate by means of a two foot wide sheet metal shear set for a 0.235 inch wide cut. The 17 to 20 strips that were cut from each plate were placed in a large test tube, which was marked to identify the cadmium plate serial number. These tubes were stored under a dry nitrogen atmosphere for later use. The resulting strips were flexible, dry charged cadmium negative electrodes.

EXAMPLE II

Electrodes were selected from Example I and were discharged at room temperature and at temperatures as low as −45° C. Both evaluations employed 31 percent potassium hydroxide electrolyte and electrode potential measurements were made against a mercuric oxide reference electrode. At room temperature and discharge rates of from 10 to 50 milliamperes per square inch, these electrodes delivered consistently specific capacities in excess of 15 ampere hours per cubic inch. At −45° C and discharge rates of 7.5 to 15 milliamperes per square inch, these electrodes delivered 11 ampere hours per cubic inch.

EXAMPLE III

Several specific evaluations as described above are shown below in Table I.

TABLE I

| Electrode No. | Discharge Rate in ma/ sq. in. | Electrode Temp. °C | Capacity −AH/in$^3$ |
|---|---|---|---|
| 1 | 7 | RT | 16.6 |
| 2 | 7 | RT | 17.1 |
| 3 | 14 | RT | 15.6 |
| 4 | 14 | RT | 16.0 |
| 5 | 44 | RT | 16.2 |
| 6 | 15 | −45 | 11.4 |
| 7 | 15 | −45 | 11.5 |

While other modifications of the invention and variations thereof, which may be employed within the scope of the invention have not been described, the invention is intended to include such as may be embraced within the following claims:

What we claim as new and desire to secure by Letters patent of the United States is:

1. In a formation process for converting negative electrode stock consisting essentially of a conductive metal matrix the interstices of which are filled by electrodeposition with a complex of cadmium hydroxide and nitrogenous compounds into a finished electrode ready for use in a primary galvanic cell, the improvement consisting essentially of the following order of steps: electrochemically charging completely the cadmium hydroxide in the complex forming spongy metallic cadmium, washing the resulting charged electrode in distilled deoxygenated water, immersing the electrode in an alcohol source to reduce water content and to aid drying, applying a vacuum system to the alcohol source, vacuum boiling the alcohol, providing a first atmosphere of dry nitrogen gas in the vacuum system, draining the alcohol and evacuating the system, vacuum drying the electrode, providing a second dry nitrogen atmosphere in the vacuum system prior to exposing the electrode to the ambient air, and compressing the electrode at a pressure of 3000 psi thereby forming a dry charged cadmium electrode of high specific capacity.

2. In a formation process as in claim 1, in which the electrochemical charging of the cadmium hydroxide in the complex is continued until a step rise in the electrode voltage value against a reference electrode and a subsequent voltage plateau is recorded showing complete reduction to spongy metallic cadmium.

3. In a formation process as in claim 1, in which the electrochemical charging of the cadmium hydroxide in the complex is continued until at least 1.5 times the charge of the electrodeposition step has been passed.

4. In a formation process as in claim 1, in which the electrochemical charging of the cadmium hydroxide in the complex is continued beyond the point when vigorous hydrogen evolution occurs indicating complete electrochemical reduction of the cadmium hydroxide complex.

* * * * *